United States Patent [19]

Clar

[11] 4,274,906

[45] Jun. 23, 1981

[54] APPARATUS FOR AUTOMATICALLY APPLYING REINFORCING TABS TO LOOSE-LEAF SHEETS

[75] Inventor: Milton Clar, Bethesda, Md.

[73] Assignee: Leonard S. Blondes, Bethesda, Md.; a part interest

[21] Appl. No.: 87,634

[22] Filed: Oct. 23, 1979

[51] Int. Cl.³ .............................................. B32B 35/00

[52] U.S. Cl. .................................... 156/540; 156/230; 156/249; 156/541; 156/574; 156/577; 156/579; 156/584; 156/DIG. 33; 156/DIG. 37; 156/DIG. 42; 156/DIG. 48; 402/79

[58] Field of Search ............... 156/230, 249, 384, 540, 156/541, 574, 577, 579, 584, DIG. 33, DIG. 37, DIG. 42, DIG. 48; 402/79

[56] References Cited

U.S. PATENT DOCUMENTS

| | | | |
|---|---|---|---|
| 915,789 | 3/1909 | McComb | 402/79 |
| 915,790 | 3/1909 | McComb | 402/79 |
| 919,621 | 4/1909 | McComb | 402/79 |
| 1,869,385 | 8/1932 | Maish | 402/79 |
| 2,437,022 | 3/1948 | Fritzinger | 402/79 |
| 2,437,640 | 3/1948 | Hedrick | 402/79 |
| 2,560,241 | 7/1951 | Pangburn et al. | 156/577 |
| 2,589,168 | 3/1952 | Vassar | 402/79 |
| 2,601,125 | 6/1952 | O'Connor | 402/79 |
| 2,764,501 | 9/1956 | Perri | 402/79 |
| 2,831,538 | 4/1958 | Lishman | 402/79 |
| 3,231,446 | 1/1966 | Satas | 156/384 |
| 3,265,553 | 8/1966 | Kind et al. | 156/384 |
| 3,286,713 | 11/1966 | Kurtz et al. | 402/79 |
| 3,315,683 | 4/1967 | Rodriguez et al. | 402/79 |
| 3,656,430 | 4/1972 | Olsson | 156/384 |
| 3,674,609 | 7/1972 | Schrotz et al. | 156/577 |
| 3,686,055 | 8/1972 | Hermann | 156/384 |
| 3,951,726 | 4/1976 | Found | 156/577 |
| 4,008,119 | 2/1977 | Hermann | 156/541 |
| 4,026,758 | 5/1977 | Yo Sato | 156/54 |
| 4,125,420 | 11/1978 | Hamisch | 156/384 |

FOREIGN PATENT DOCUMENTS

| | | | |
|---|---|---|---|
| 41-7586 | 9/1966 | Japan | 156/584 |
| 643124 | 9/1950 | United Kingdom . | |

*Primary Examiner*—Caleb Weston
*Attorney, Agent, or Firm*—Shapiro and Shapiro

[57] ABSTRACT

A method and apparatus for automatically applying reinforcing tabs to sheets in a loose-leaf binder includes a projecting tab guide sized to fit within a ring of the loose-leaf binder and adapted to apply a reinforcing tab between the edge of the sheet and a hole in the sheet through which the ring passes. Pressure-sensitive adhesive-back reinforcing tabs are separated from the carrier strip as the strip passes around a deflecting edge adjacent to an end of the tab guide. An inclined pressure foot presses the separated tab onto the sheet to attach it thereto.

10 Claims, 9 Drawing Figures

APPARATUS FOR AUTOMATICALLY APPLYING REINFORCING TABS TO LOOSE-LEAF SHEETS

BACKGROUND OF THE INVENTION

The present invention is concerned with a new method and apparatus for automatically applying reinforcing tabs to sheets held in loose-leaf binders to reinforce the holes in the sheets through which the rings of the binder pass.

A common problem encountered in using loose-leaf binders to hold sheets of paper and the like is the tendency of the sheets to rip or tear in the margin area of the sheet, between its edge and the hole in the sheet for the binder ring. The tendency of sheets to tear becomes more pronounced with use or when the binder is nearly full. To repair torn sheets or to prevent sheets from being torn, it is well known to reinforce the holes in the sheets with reinforcing tabs, such as annular rings of cloth, etc., which have a water-activated glue backing. One of the difficulties in using such reinforcing tabs is that the tabs cannot be conveniently applied to the loose-leaf sheets unless the sheets are removed from the binder. This is burdensome and time-consuming, particularly when repairing a large number of sheets.

To overcome this difficulty, reinforcing tabs capable of being applied without removing the sheets have previously been proposed. For example, U.S. Pat. No. 2,437,640 to Hendrick, issued Mar. 9, 1948, discloses C-shaped reinforcing tabs which can be placed around the rings and can be attached to the sheets in the binder. Double U-shaped tabs designed to fit around the edge of a sheet and attached to both sides thereof are disclosed in U.S. Pat. No. 2,589,168 to Vassar, issued Mar. 11, 1952. Split-rim reinforcing tabs comprising an aperture communicating with the periphery of the tab by a slot are disclosed in U.S. Pat. No. 3,315,683 to Rodriquez et al, issued Apr. 25, 1967. Although such tabs may be applied to loose-leaf sheets without removal of the sheets from the loose-leaf binder, all have the disadvantage of requiring manipulation by hand within the confined spaces of the rings of the binder. Furthermore, such tabs are still time-consuming to apply.

While the problems encountered in reinforcing sheets in loose-leaf binders have been longstanding, the prior art is devoid of any teaching of a method or apparatus for automatically and quickly applying reinforcing tabs to loose-leaf sheets without requiring the removal of the sheets from the loose-leaf binder. It is desirable to provide such a method and apparatus, and it is to this end that the present invention is directed.

SUMMARY OF THE INVENTION

Accordingly, it is a principal object of the invention to provide a method and apparatus for automatically applying reinforcing tabs to loose-leaf sheets.

It is a further object to provide a method and apparatus for applying reinforcing tabs to loose-leaf sheets which do not require the removal of the sheets from the binder.

It is a still further object to provide such a method and apparatus which is quick and easy to use.

Briefly stated, in a method and an apparatus according to the invention for applying reinforcing tabs to sheets in a loose-leaf binder between the edge of the sheet and a hole for the binder ring, which accomplish the above objectives and which have certain other desirable advantages and features, a tab guide, sized to fit within the ring of a loose-leaf binder, is inserted into the ring to position a tab-bearing carrier strip between the edge of the sheet and the hole, a tab is separated from the carrier strip within the ring and the tab is pressed onto the loose-leaf sheet.

DESCRIPTION OF THE PREFERRED EMBODIMENTS

Figure 1:
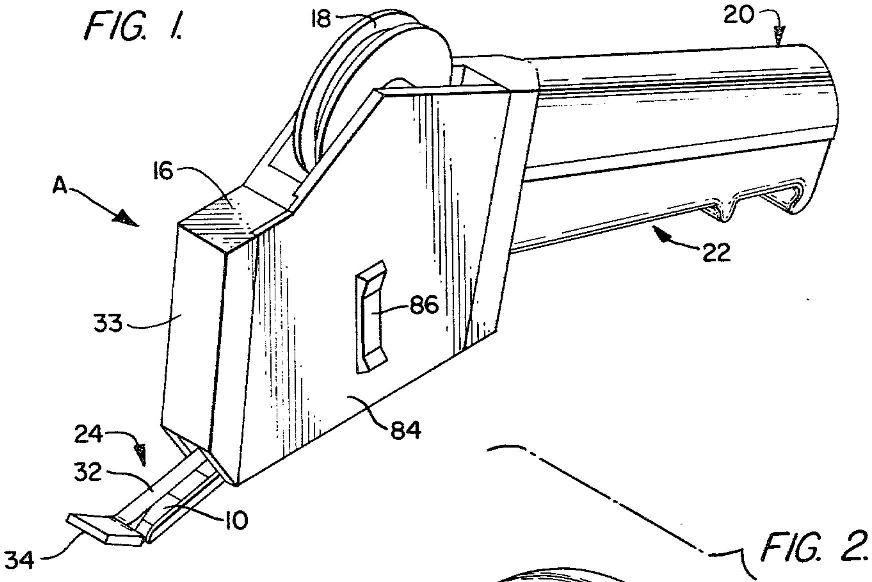
FIG. 1 is a perspective view of a tab applicator in accordance with the invention.

Referring to the Figures, a tab applicator apparatus A in accordance with the invention is illustrated which automatically applies reinforcing tabs 10, such as pressure-sensitive, adhesive-backed tabs carried on a supporting carrier strip 12, to sheets 14 in a loose-leaf binder. Generally, the apparatus includes a case 16 for holding a roll 18 of reinforcing tabs. Extending from one end of the case, is a hand grip 20 having an actuating handle 22 for operating the device. Extending from the opposite end of the case is an elongated projecting member 24 dimensioned to fit within the ring 26 of the loose-leaf binder for applying a tab to the margin area of the sheet between the edge 28 of the sheet and a hole 30 in the sheet through which the ring passes.

Figure 7:
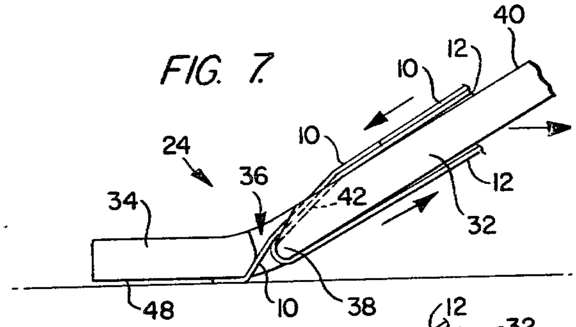
Figure 8:
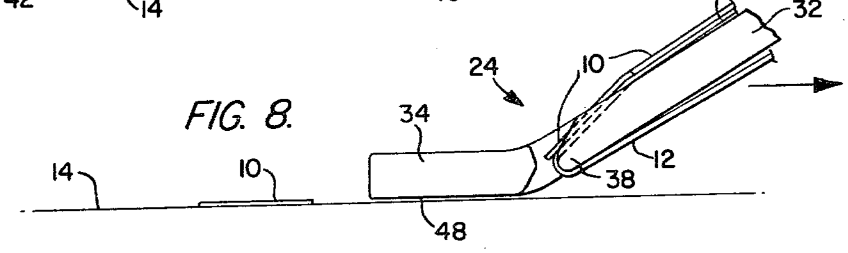

Projecting member 24 generally includes a planar tab guide 32 extending outwardly and slightly downwardly from the front 33 of case 16, and a pressure foot 34 angled upwardly from the end of the tab guide portion of the projecting member. Between the tab guide 32 and the pressure foot 34, a transverse slot 36 preferably extends from approximately the center of the projecting member to one side 37 thereof. A smoothly curved deflecting edge 38 at the end of the tab guide forms one side of slot 36. Preferably, the diameter of deflecting edge 38 (cross section in FIGS. 6–8) is less than the thickness of projecting member 24. A sloping guide channel 42 connects deflecting edge 38 with the upper surface 40 of the tab guide. Channel 42, which has a width slightly larger than the width of the tab-bearing carrier strip 12 (FIG. 9), guides the carrier strip from the upper surface 40 of the tab guide to the deflecting edge. The carrier strip is bent around deflecting edge 38 and fed along the underside of the tab guide back into case 16.

The projecting member 24 of the tab applicator serves to position the tab-bearing carrier strip within the ring of the loose-leaf binder, separate a tab from the carrier strip within the ring, and apply the tab to the sheet, in a manner which will now be described.

Figure 2:
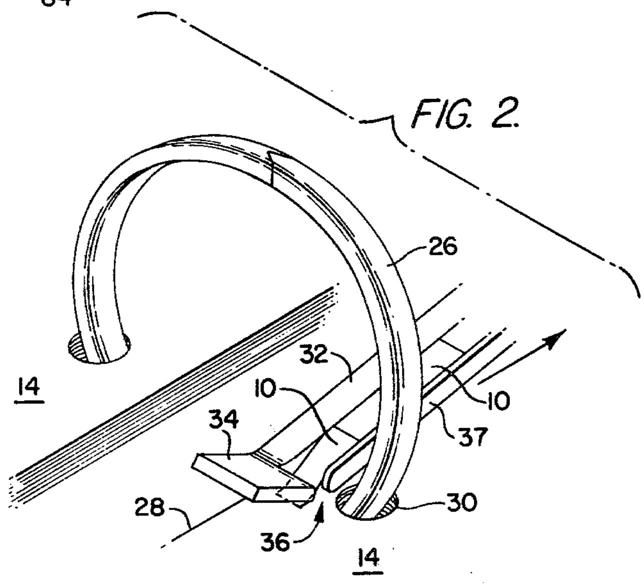
FIG. 2 is an enlarged perspective view illustrating the use of the tab applicator to apply a reinforcing tab to a sheet in a loose-leaf binder.
Figure 6:
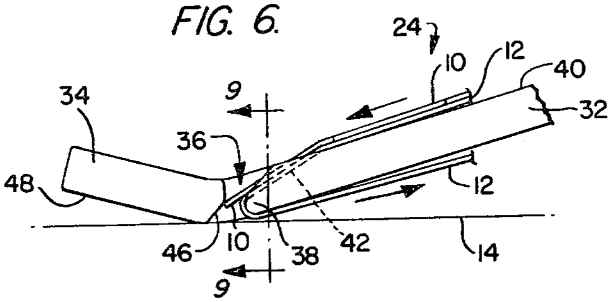
FIGS. 6, 7, and 8 are enlarged side views sequentially illustrating the operation of the tab applicator.

To apply a tab, the projecting member 24 is inserted into a ring 26 of the loose-leaf binder (FIG. 2). The tab guide is positioned so that side 37 is adjacent to the ring and sloping channel 42 and deflecting edge 38 are positioned over the margin area of the sheet 14 between its edge 28 and hold 30. The tab-bearing carrier strip 12 is then pulled around deflecting edge 38, in a manner to be described hereinafter. As the carrier strip is pulled through a bend of approximately 180° around deflecting edge 38, the carrier strip is peeled away from a tab 10 at the end of the tab guide (FIG. 6), causing the tab to be separated from the carrier strip in a well-known manner. As the tab is separated from the carrier strip and the carrier strip continues to be pulled around deflecting edge 38, the tab continues to move in the same general direction as the slope of channel 42 and enters slot 36 (FIG. 6). Continued movement of the carrier strip causes the tab to contact an end surface 46 of pressure foot 34, which faces the deflecting edge 38. Surface 46 is angled to direct the tab being separated from the carrier strip to a sheet 14 beneath the pressure foot. As the tab separates from the carrier strip and contacts the sheet, projecting member 24 is simultaneously pulled back out of the ring (to the right as viewed in FIGS. 7 and 8), causing the pressure foot to press the tab onto the sheet and attach it thereto. The projecting member may also be rotated slightly counterclockwise from its position in FIG. 6 as it is pulled to the right, so that bottom surface 48 of the pressure foot is parallel to the sheet. A slight downward pressure may be applied to the projecting member so that bottom surface 48 smooths the tab as it presses it onto the sheet.

Figure 3:
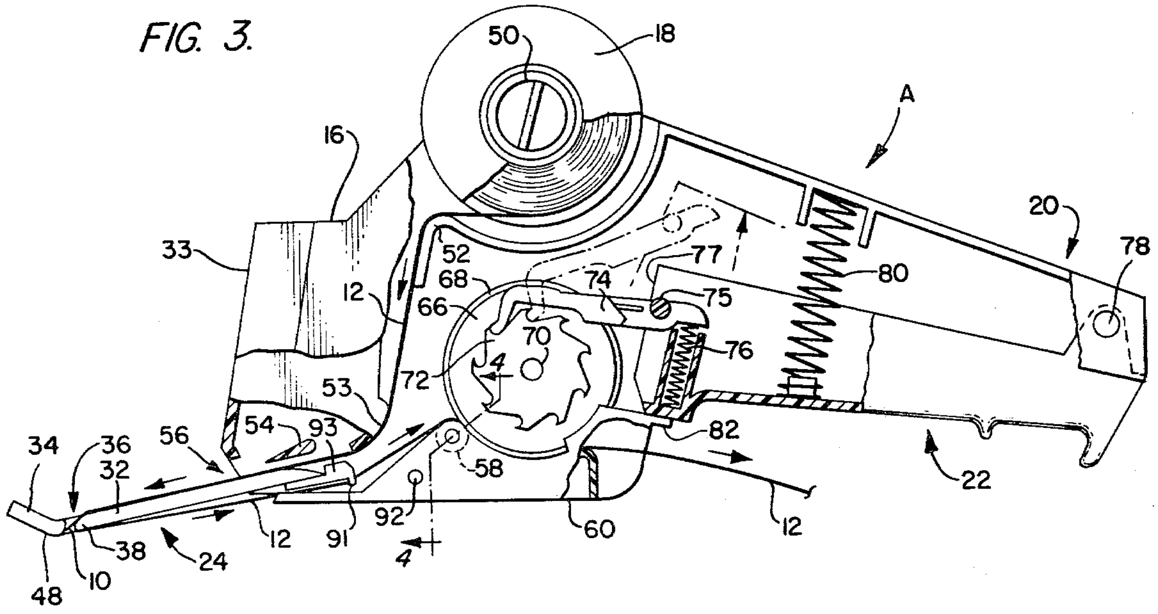
FIG. 3 is a side view of the apparatus of FIG. 1, partially broken away.
Figure 4:
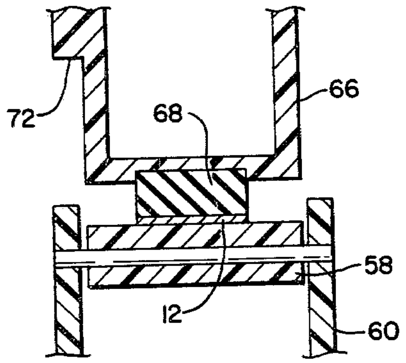
FIG. 4 is a partial sectional view taken approximately in the direction of line 4—4 of FIG. 3.
Figure 9:
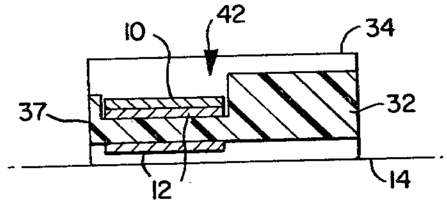
FIG. 9 is a sectional view taken approximately in the direction of line 9—9 of FIG. 6.

Preferably, deflecting edge 38 and sloping channel 42 are positioned adjacent to one side of the tab guide 32 (side 37 in the preferred form of the invention as best illustrated in FIGS. 2 and 9). This allows the projecting member to be inserted into a ring 26 of a loose-leaf binder with side 37 next to the ring and permits the tab to be properly positioned in the margin area of the sheet between its edge 28 and a hole 30 for the binder ring. The length of tab guide 32 between deflecting edge 38 and the front side 33 of case 16 is sufficient to permit deflecting edge 38 to be positioned adjacent to and slightly beyond hole 30 within the binder ring, as illustrated in FIG. 2. Preferably, this length is also sufficient to permit the tab applicator to be rotated to bring the pressure foot surface 48 into contact with the sheet without interference between the binder ring 26 and the front 33 of the case. Angling projecting member 24 slightly downward, as shown in FIG. 3, also facilitates this.

Figure 5:
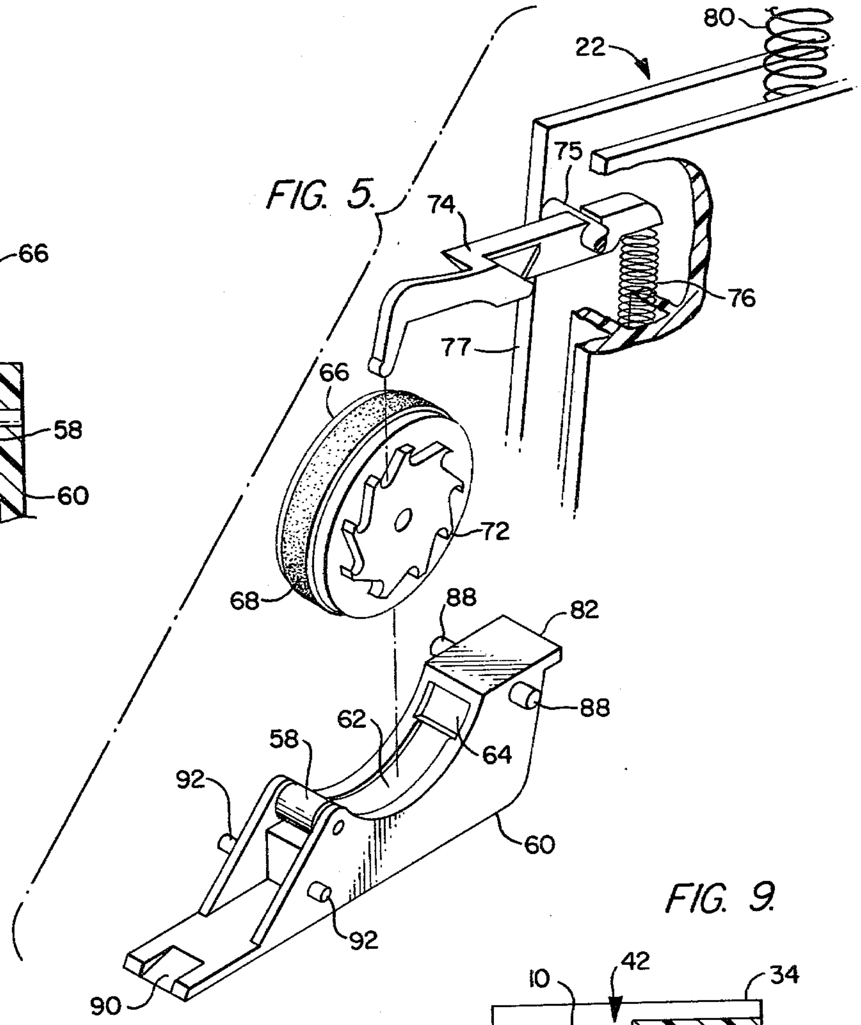
FIG. 5 is an enlarged exploded perspective view illustrating certain details of the tab applicator of FIG. 3.

Turning now to a detailed description of the tab applicator apparatus A, a roll 18 of tabs is mounted on a spindle 50 within the case 16. The tab-bearing carrier strip 12 from roll 18 is guided around partitions 52, 53, 54 within case 16 and through an opening 56 to projecting member 24 (FIG. 3). After passing around deflecting edge 38 of the tab guide 32, the carrier strip 12 is fed back into the case and over a roller 58 mounted on a bottom member 60 of the case. From the roller 58, the carrier strip is guided by a curved channel 62 in bottom member 60 to a window 64 and out of the back of the case (FIGS. 3 and 5).

Contacting roller 58 is a pinch roller or drive wheel 66 having a tire 68 as of rubber or other suitable resilient material around its circumference. The carrier strip is compressed between tire 68 and roller 58 so that as the drive wheel turns, the carrier strip is pulled around deflecting edge 38 and passed through window 64 out of the back of the case.

Drive wheel 66, which is mounted for rotation on a shaft 70 within the case, may have a ratchet gear 72 formed on one face of the wheel, which is cooperable with a pawl 74 to rotate the drive wheel. The pawl is pivoted about a pin 75 in the front end 77 of handle 22, and biased by a coil spring 76 so that it engages ratchet gear 72. Handle 22 is pivoted at its rear end about a pin 78 and biased by coil spring 80 within grip 20 and handle 22 against ledge 82 formed on the bottom member 60. Grip 20 and handle 22 preferably are hollow and are sized so that the handle can move into the grip when it is squeezed (FIG. 3).

When the handle is squeezed, it rotates about pivot pin 78 and moves into the hollow grip 20, to approximately the position indicated by the phantom lines in FIG. 3. As the handle is squeezed, coil spring 76 maintains pawl 74 in contact with the ratchet gear so that the pawl moves to the next tooth of the ratchet gear. When the handle is released, coil spring 80 forces the handle back to its rest position in engagement with ledge 82. As the handle moves back to its rest position, pawl 74 straightens out, pushing against ratchet gear 72, and causes the drive wheel to rotate counterclockwise (as viewed in FIG. 3). The rotation of the drive wheel pulls carrier strip 12 over roller 58, as previously described, to automatically separate a tab 10 from the carrier strip as it passes around the deflecting edge 38. The amount by which drive wheel 66 rotates is determined primarily by the pitch of ratchet gear 72 and the length of pawl 74. The amount of rotation is preferably selected such that the length of carrier strip pulled around the deflecting edge is sufficient to separate a single tab from the carrier strip.

To load the tab applicator, a roll 18 of tabs is mounted on spindle 50 by removing a side panel 84 from case 16. A latch mechanism 86 may be provided on side panel 84 for this purpose. The strip of tabs from the roll may then be guided around partitions 52, 53 and 54 within the case, through opening 56, and around deflecting edge 38, as previously described. Since slot 36 is open to side 37 of the projecting member 24, the threading of the carrier strip around deflecting edge 38 is facilitated.

The bottom member 60 is preferably pivoted within the case about pins 88 extending from the sides of the member 60 adjacent to ledge 82, so that it may be swung downwardly to open it and to permit the carrier strip to be fed over roller 58, through channel 62, and out of the back of member 60 through window 64. The bottom member 60, when closed, compresses the carrier strip between roller 58 and drive wheel 66. A notched front end portion 90 of bottom member 60 forms a channel which cooperates with a second notch formed by a pair of downward projections 91 from a fixed member 93 within the case, one such projection being shown in FIG. 3, to guide the carrier strip from deflecting edge 38 over roller 58. A pair of studs or pins 92 extending from either side of the bottom member near roller 58 may be provided to engage detents, not illustrated, in the sides of the case to hold the bottom member in a closed position. After loading, the tab applicator is ready for use.

The tab applicator is preferably molded from plastic materials in a well-known manner. The portion of the apparatus which advances the tab-bearing carrier strip through the device may be similar in construction to conventional labeling machines such as disclosed, for example, in U.S. Pat. No. 4,026,758 to Sato, issued May 31, 1977; U.S. Pat. No. 4,008,119 to Hermann, issued Feb. 15, 1977; or U.S. Pat. No. 3,265,553 to Kind et al, issued Aug. 9, 1966. However, such labeling machines were never intended for applying reinforcing tabs to the margin area of sheets in a loose-leaf binder and are incapable of so doing. The construction of such machines does not allow them to fit within the rings of loose-leaf binders, and they do not have a projecting tab guide with a deflecting edge adjacent to an end thereof as does the apparatus of the invention. Typically, the mechanism for separating labels from a carrier strip in these devices is located beneath a forward portion of their case. Accordingly, it cannot be positioned within the binder ring, even with the ring opened. Moreover, the labels used with such labeling machines are too wide to fit in the margin area of the sheet.

As previously described, the projecting member 24 should extend beyond the front of the device by an amount sufficient to permit it to be easily inserted within the rings of a loose-leaf binder and position the tabs at the proper position on the sheet. Also, the case should have no protruding front portions which would interfere with the proper positioning of the projecting member within the ring or inhibit its rotation to bring the bottom surface of the pressure foot into contact with the tab as it is pressed onto the sheet. A distance between deflecting edge 38 and the front 33 of the case of at least approximately $\frac{5}{8}$ inch is sufficient for this purpose. In the preferred form of the invention illustrated, the tab guide length between the deflecting edge and the front of the case is approximately $1\frac{1}{8}$ inch, the pressure foot 34 length is approximately $\frac{3}{8}$ inch, and the width of the projecting member is approximately $\frac{1}{2}$ inch.

The reinforcing tabs used in the device of the invention should have a width which is narrow enough to fit within the margin area of the sheet between the ring hole and the edge of the sheet. The length of the reinforcing tabs is preferably at least twice their width. In the preferred form of the invention illustrated, the dimensions of the reinforcing tabs are $\frac{1}{2}$ inch long by $\frac{1}{8}$ inch wide, and the reinforcing tabs are preferably formed with the ends of adjacent tabs on the carrier strip abutting each other, as illustrated.

Remarkably, the invention will automatically apply reinforcing tabs very quickly and efficiently to a multiplicity of sheets in a loose-leaf binder, without the necessity of removing the sheets from the binder or even the necessity of opening the binder rings. Obviously, however, the invention also may be used to apply tabs to sheets with the binder rings opened, or with the sheets removed from the binder. There is no other known prior method or apparatus which can accomplish this function.

While the foregoing description has been with reference to a particular embodiment, it will be appreciated by those skilled in the art that variations are possible without departing from the principles and spirit of the invention, the scope of which is defined by the appended claims.

What is claimed is:

1. An apparatus that automatically applies a reinforcing tab carried on a carrier strip to a sheet in a loose-leaf binder at the region of the sheet between a hole in the sheet through which a ring of the loose-leaf binder passes and an adjacent edge of the sheet, comprising a tab guide projecting from a case, the tab guide sized to fit within the ring of the loose-leaf binder and to position the carrier strip between the edge of the sheet and the hole in the sheet through which the ring passes, means mounted on the case for advancing the carrier strip around an end of the tab guide within the ring, means for separating a tab from the carrier strip as it passes around said end, and means on the tab guide for pressing the tab onto the sheet.

2. The apparatus of claim 1, wherein the means for separating comprises a deflecting edge at the end of the tab guide.

3. The apparatus of claim 2, wherein the means for pressing comprises a pressure foot adjacent to the deflecting edge, the pressure foot having a directing surface for directing the separated tab to the sheet and a pressure surface for pressing the tab onto the sheet.

4. The apparatus of claim 3, wherein the pressure foot projects from the end of the tab guide at an angle thereto.

5. The apparatus of claim 2, wherein the tab guide further comprises a channel for guiding the carrier strip around the deflecting edge.

6. The apparatus of claim 5, wherein the means for advancing comprises a drive wheel positioned to contact a roller, the carrier strip passing between the drive wheel and the roller, and wherein the drive wheel and the roller are mounted in the case from which the tab guide projects, and means for rotating the drive wheel by a predetermined amount to pull the carrier strip around the deflecting edge.

7. The apparatus of claim 6, wherein the means for rotating comprises a pawl pivotally mounted on a movable handle, the pawl cooperable with a ratchet gear on a side face of the drive wheel to rotate the drive wheel by the predetermined amount.

8. The apparatus of claim 7, wherein rotation of the drive wheel by the predetermined amount separates a single tab from the carrier strip.

9. The apparatus of claim 6, wherein the drive wheel includes a resilient material around its circumference for compressing the carrier strip between the drive wheel and the roller.

10. The apparatus of claim 1, wherein the case includes means for holding a supply of reinforcing tabs, and means for guiding the carrier strip carrying the tabs to the tab guide.

* * * * *